US008686964B2

(12) United States Patent
Rimon (10) Patent No.: US 8,686,964 B2
(45) Date of Patent: Apr. 1, 2014

(54) USER SPECIFIC RECOGNITION OF INTENDED USER INTERACTION WITH A DIGITIZER

(75) Inventor: Ori Rimon, Tel-Aviv (IL)

(73) Assignee: N-trig Ltd., Kfar-Saba (IL)

( * ) Notice: Subject to any disclaimer, the term of this patent is extended or adjusted under 35 U.S.C. 154(b) by 885 days.

(21) Appl. No.: 11/822,951

(22) Filed: Jul. 11, 2007

(65) Prior Publication Data

US 2008/0012838 A1 Jan. 17, 2008

Related U.S. Application Data

(60) Provisional application No. 60/830,335, filed on Jul. 13, 2006.

(51) Int. Cl.
*G06F 3/045* (2006.01)

(52) U.S. Cl.
USPC .................... 345/174; 345/173; 178/18.03

(58) Field of Classification Search
USPC ................ 345/173–183; 178/18.01–18.11, 178/19.01–19.07
See application file for complete search history.

(56) References Cited

U.S. PATENT DOCUMENTS

| 4,686,332 | A | 8/1987 | Greanias et al. |
| 4,707,845 | A | 11/1987 | Krein et al. |
| 4,764,885 | A | 8/1988 | Greanias et al. |
| 5,825,352 | A | 10/1998 | Bisset et al. |
| 5,831,600 | A | 11/1998 | Inoue et al. |
| 5,841,078 | A | 11/1998 | Miller et al. |
| 5,854,881 | A * | 12/1998 | Yoshida et al. ............... 345/104 |
| 6,075,520 | A | 6/2000 | Inoue et al. |
| 6,222,528 | B1 | 4/2001 | Gerpheide et al. |
| 6,297,811 | B1 | 10/2001 | Kent et al. |
| 6,498,602 | B1 | 12/2002 | Ogawa |
| 6,690,156 | B1 | 2/2004 | Weiner et al. |
| 6,778,686 | B1 | 8/2004 | Hestnes et al. |
| 6,781,577 | B2 | 8/2004 | Shigetaka |
| 6,930,672 | B1 | 8/2005 | Kuribayashi |
| 7,038,659 | B2 | 5/2006 | Rajkowski |
| 7,190,348 | B2 | 3/2007 | Kennedy et al. |
| 7,339,418 | B2 | 3/2008 | Regier |
| 7,683,888 | B1 | 3/2010 | Kennedy et al. |
| 7,701,447 | B2 | 4/2010 | Lii et al. |
| 7,847,789 | B2 | 12/2010 | Kolmykov-Zotov et al. |
| 7,868,874 | B2 | 1/2011 | Reynolds |

(Continued)

FOREIGN PATENT DOCUMENTS

| EP | 0814423 | 12/1997 |
| EP | 1335318 | 8/2003 |

(Continued)

OTHER PUBLICATIONS

International Search Report and the Written Opinion Dated Jun. 3, 2008 From the International Searching Authority Re. Application No. PCT/IL2007/000870.

(Continued)

*Primary Examiner* — Kevin M Nguyen
*Assistant Examiner* — Kenneth B Lee, Jr.

(57) ABSTRACT

A method and system for recognition of an intended user interaction with a digitizer is provided, the method comprising characterizing an intended user interaction input signals of a specific user, storing at least one characterization criterion from the characterization, and determining if a subsequently detected input signals meets the at least one characterization criterion.

53 Claims, 7 Drawing Sheets

(56) References Cited

U.S. PATENT DOCUMENTS

| | | | |
|---|---|---|---|
| 8,059,102 | B2 | 11/2011 | Rimon et al. |
| 2002/0015024 | A1 | 2/2002 | Westerman et al. |
| 2002/0163506 | A1 | 11/2002 | Matusis |
| 2003/0098858 | A1 | 5/2003 | Perski et al. |
| 2003/0133598 | A1 | 7/2003 | Recce |
| 2003/0179323 | A1 | 9/2003 | Abileah et al. |
| 2004/0012579 | A1 | 1/2004 | Nagasaka et al. |
| 2004/0021633 | A1 | 2/2004 | Rajkowski |
| 2004/0056245 | A1 | 3/2004 | Thomas et al. |
| 2004/0085300 | A1 | 5/2004 | Matusis |
| 2004/0095333 | A1 | 5/2004 | Morag et al. |
| 2004/0155871 | A1* | 8/2004 | Perski et al. .......... 345/174 |
| 2004/0174832 | A1 | 9/2004 | Geiger et al. |
| 2004/0178997 | A1 | 9/2004 | Gillespie et al. |
| 2005/0099398 | A1 | 5/2005 | Garside et al. |
| 2006/0012580 | A1 | 1/2006 | Perski et al. |
| 2006/0012581 | A1* | 1/2006 | Haim et al. .......... 345/173 |
| 2006/0026521 | A1 | 2/2006 | Hotelling et al. |
| 2006/0026535 | A1 | 2/2006 | Hotelling et al. |
| 2006/0097991 | A1 | 5/2006 | Hotelling et al. |
| 2006/0109252 | A1* | 5/2006 | Kolmykov-Zotov et al. . 345/173 |
| 2006/0214926 | A1 | 9/2006 | Kolmykov-Zotov et al. |
| 2006/0267953 | A1 | 11/2006 | Peterson, Jr. et al. |
| 2006/0279548 | A1 | 12/2006 | Geaghan |
| 2007/0075968 | A1 | 4/2007 | Hall et al. |
| 2007/0097096 | A1 | 5/2007 | Rosenberg |
| 2007/0285404 | A1 | 12/2007 | Rimon et al. |
| 2008/0005703 | A1 | 1/2008 | Radivojevic et al. |
| 2008/0012835 | A1 | 1/2008 | Rimon et al. |
| 2008/0218494 | A1 | 9/2008 | Perski et al. |

FOREIGN PATENT DOCUMENTS

| | | |
|---|---|---|
| EP | 1391807 | 2/2004 |
| GB | 1486988 | 9/1977 |
| JP | 02-095005 | 4/1990 |
| JP | 07-230352 | 8/1995 |
| JP | 2000-020229 | 1/2000 |
| JP | 2002-082765 | 3/2002 |
| JP | 2002-342033 | 11/2002 |
| JP | 2005-031754 | 2/2005 |
| JP | 2005-031799 | 2/2005 |
| JP | 2005-149531 | 6/2005 |
| WO | WO 97/36225 | 10/1997 |
| WO | WO 03/005293 | 1/2003 |
| WO | WO 2004/051392 | 6/2004 |
| WO | WO 2005/114369 | 12/2005 |
| WO | WO 2007/144881 | 12/2007 |
| WO | WO 2008/007372 | 1/2008 |

OTHER PUBLICATIONS

Response Dated Sep. 14, 2010 to Official Action of Jun. 15, 2010 From the US Patent and Trademark Office Re. U.S. Appl. No. 11/808,868.

Official Action Dated Oct. 5, 2010 From the US Patent and Trademark Office Re. U.S. Appl. No. 11/808,868.

Response Dated Mar. 10, 2008 to Written Opinion of Sep. 27, 2007 From the International Searching Authority Re.: Application No. PCT/IL2007/000712.

International Preliminary Report on Patentability Dated Jul. 9, 2008 From the International Preliminary Examining Authority Re.: Application No. PCT/IL2007/000712.

International Search Report Dated Sep. 27, 2007 From the International Searching Authority Re.: Application No. PCT/IL2007/000712.

Official Action Dated Jun. 15, 2010 From the US Patent and Trademark Office Re. U.S. Appl. No. 11/808,868.

Response Dated Sep. 13, 2010 to Office Action of May 24, 2010 From the State Intellectual Property Office of the People's Republic of China Re. Application No. 200780030159.6.

Translation of Office Action Dated May 24, 2010 From the State Intellectual Property Office of the People's Republic of China Re. Application No. 200780030159.6.

Written Opinion Dated Sep. 27, 2007 From the International Searching Authority Re.: Application No. PCT/IL2007/000712.

International Preliminary Report on Patentability Dated Jan. 13, 2009 From the International Bureau of WIPO Re.: Application No. PCT/IL2007/000870.

Official Action Dated May 12, 2011 From the US Patent and Trademark Office Re. U.S. Appl. No. 11/822,950.

Official Action Dated May 17, 2011 From the US Patent and Trademark Office Re. U.S. Appl. No. 11/808,868.

Response Dated Apr. 28, 2011 to Official Action of Jan. 28, 2011 From the US Patent and Trademark Office Re. U.S. Appl. No. 11/808,868.

Official Action Dated Jan. 28, 2011 From the US Patent and Trademark Office Re. U.S. Appl. No. 11/808,868.

Response Dated Nov. 3, 2010 to Official Action of Oct. 5, 2010 From the US Patent and Trademark Office Re. U.S. Appl. No. 11/808,868.

Response Dated Jan. 13, 2011 to Office Action of Nov. 11, 2010 From the State intellectual Property Office of the People's Republic of China Re. Application No. 200780030159.6.

Translation of Office Action Dated Nov. 11, 2010 From the State Intellectual Property Office of the People's Republic of China Re. Application No. 200780030159.6.

Translation of Office Action Dated Jun. 9, 2011 From the State Intellectual Property Office of the People's Republic of China Re. Application No. 200780030159.6.

Response Dated Jul. 5, 2011 to Official Action of May 12, 2011 From the US Patent and Trademark Office Re. U.S. Appl. No. 11/822,950.

Response Dated Jul. 12, 2011 to Office Action of Jun. 9, 2011 From the State Intellectual Property Office of the People's Republic of China Re. Application No. 200780030159.6.

Response Dated Jul. 28, 2011 to Official Action of May 17, 2011 From the US Patent and Trademark Office Re. U.S. Appl. No. 11/808,868.

Translation of Office Action Dated Sep. 7, 2011 From the State Intellectual Property Office of the People's Republic of China Re. Application No. 200780030159.6.

Notice of Allowance Dated Aug. 26, 2011 From the US Patent and Trademark Office Re. U.S. Appl. No. 11/808,868.

Acknowledgement of Request Dated Oct. 13, 2011 Following Notice of Allowance of Aug. 26, 2011 From the US Patent and Trademark Office Re. U.S. Appl. No. 11/808,868.

Official Action Dated Oct. 17, 2011 From the US Patent and Trademark Office Re. U.S. Appl. No. 11/822,950.

Response Dated Nov. 1, 2011 to Office Action of Sep. 7, 2011 From the State Intellectual Property Office of the People's Republic of China Re. Application No. 200780030159.6.

Translation of Notice of Reason for Rejection Dated Mar. 2, 2012 From the Japanese Patent Office Re. Application No. 2009-519057.

Greanias et al. Abstract of Corresponding Document: US 4,686,332.

Rekimoto "SmartSkin: An Infrastructure for Freehand Manipulation on Interactive Surfaces", CHI 2002, Minneapolis, Minnesota, USA, Apr. 20-25, 2002, 4(1): 113-120, 2002.

Translation of Notice of Reason for Rejection Dated Jan. 6, 2012 From the Japanese Patent Office Re. Application No. 2009-514995.

Official Action Dated Mar. 6, 2012 From the US Patent and Trademark Office Re. U.S. Appl. No. 11/822,950.

Translation of Notice of Reason for Rejection Dated Nov. 9, 2012 From the Japanese Patent Office Re. Application No. 2009-519057.

Official Action Dated Jul. 23, 2013 From the US Patent and Trademark Office Re. U.S. Appl. No. 11/822,950.

Official Action Dated Nov. 20, 2013 From the US Patent and Trademark Office Re. U.S. Appl. No. 11/822,950.

* cited by examiner

USER SPECIFIC RECOGNITION OF INTENDED USER INTERACTION WITH A DIGITIZER

RELATED APPLICATIONS

The present application claims the benefit under section 35 U.S.C. §119(e) of U.S. Provisional Application No. 60/830,335 filed on Jul. 13, 2006 which is hereby incorporated by reference.

FIELD OF THE INVENTION

The present invention relates to a digitizer, and more particularly to finger touch sensitive digitizers.

BACKGROUND OF THE INVENTION

Touch technologies are commonly used as input devices for a variety of products. The usage of touch devices of various kinds is growing sharply due to the emergence of new mobile devices such as Personal Digital Assistants (PDA), tablet PCs and wireless flat panel displays (FPD). Some of these devices are not connected to standard keyboards, mice or like input devices, which are deemed to limit their mobility. Instead there is a tendency to use touch input technologies of one kind or another. A stylus and/or finger may be used as a user interaction.

U.S. Pat. No. 6,690,156 entitled "Physical Object Location Apparatus and Method and a Platform using the same" and US Patent Publication No. 20040095333 entitled "Transparent Digitizer" both of which are assigned to N-trig Ltd., the contents of both which are incorporated herein by reference, describe an electromagnetic method for locating physical objects on a FPD and a transparent digitizer that can be incorporated into an electronic device, typically over the active display screen. The digitizer sensor includes a matrix of vertical and horizontal conducting lines to sense an electric signal. Positioning the physical object at a specific location on the digitizer provokes a signal whose position of origin may be detected.

U.S. Patent Application Publication No. 20040155871 entitled "Touch Detection for a Digitizer" assigned to N-trig Ltd, which is incorporated herein by reference in its entirety, describes a digitizing tablet system capable of detecting position of physical objects and/or finger touch using the same sensing conductive lines. Typically, the system includes a transparent sensor overlaid on a FPD. The digitizer's sensor includes a matrix of vertical and horizontal conducting lines to sense an electric signal. Touching the digitizer in a specific location provokes a signal whose position of origin may be detected.

U.S. Patent Application Publication No. 20060012580, entitled "Automatic Switching for a Dual Mode Digitizer" assigned to N-Trig, the contents of which is incorporated herein by reference, describes a method utilizing different types of user interactions, e.g. electromagnetic stylus and touch, in a digitizer system. A method for palm rejection based on the size of the detected area of the touch is described.

SUMMARY OF THE INVENTION

An aspect of some embodiments of the invention is the provision of a system and method for user specific recognition of intended user interaction with a digitizer. In some exemplary embodiments, user interaction includes one or more of the following, stylus tip, finger touch, stylus hovering, and finger hovering. According to some exemplary embodiments, user specific finger touch recognition provides differentiating between detected input signals to a digitizer intended by a user for user interaction and other detected input signals to the digitizer not intended by the user for user interaction, e.g. due to one or more of a hand resting on the digitizer, finger and hand hovering over the digitizer, and/or mechanical changes between the digitizer and the LCD. According to some embodiments of the present invention, the user specific recognition includes a calibration procedure where, for example, finger touch of a specific user is characterized based on one or more characterization criteria and a verification procedure where input signal to the digitizer is compared to the defined characterization to verify that the input signal detected qualifies for user intended finger touch input. The present inventors have found that although finger touch input signals can vary widely for different users e.g. due to varying finger width and due to users applying varying pressure during user interaction, a specific user typically has a consistent and/or repeatable finger touch input signal. User specific calibration may facilitate improved and/or fine tuned recognition of an intended user interaction with a digitizer for a specific user and help differentiate between input signals not intended by the specific user for user interaction, e.g. input signals due to due to one or more of a hand resting on the digitizer, finger and hand hovering over the digitizer, and/or mechanical changes between the digitizer and the LCD and finger touch input signals intended by the specific user for user interaction. Similarly stylus touch, stylus hovering, and finger hovering recognition provides differentiating between detected input signals to a digitizer intended by a user for user interaction and other detected input signals to the digitizer not intended by the user for user interaction. Input signals determined not to meet the one or more characterization criteria for user intended user interaction are rejected, e.g. not forwarded to the host computer.

According to some embodiments of the present invention, calibration of a user specific finger touch input signal to a digitizer is performed. In some exemplary embodiments feature extraction is performed to characterize and/or define one or more characterization criterion for one or more finger touch inputs signal of the user. Finger touch input to a digitizer of the user is characterized by one or more signal parameters and/or characterization criteria. In some exemplary embodiments the signal parameters include the number of conducting lines of the digitizer detecting a signal, the amplitude of detected signals, an amount of applied pressure on the digitizer, the size of the finger touch, the width of the finger touch, the length of the finger touch, the shape of the finger touch, etc. According to exemplary embodiments of the present invention, characterization criteria are defined based on one or more specified signal parameter thresholds. According to some exemplary embodiments, characterization is defined based on correlation with one or more specified patterns of one or more signal parameters.

In some exemplary embodiments, characterization of a finger touch input signal is performed during a dedicated calibration procedure. In some exemplary embodiments of the present invention, finger touch characterization is performed during user operation of the digitizer system. According to some exemplary embodiment, the characterization is performed once for each defined user. According to some exemplary embodiments, the characterization is performed during each system startup. According to some exemplary embodiments, the characterization is periodically updated.

According to some embodiments of the present invention, verification is performed by determining whether the input signal to the digitizer meets the defined characterization criteria of the user's finger touch. An input signal that matches the characterized finger touch is accepted as intended finger touch input for the specified user and used as an input command to the digitizer. For cases when the input signal doesn't meet the characterization criteria for finger touch, the input signal is rejected and/or ignored, e.g. the signal is not transmitted to the host computer associated with the digitizer. According to some exemplary embodiments, verification can be implemented for palm rejection. For example, input signals derived from a hand resting on the digitizer will be rejected.

An aspect of some embodiments of the present invention provides a method for recognition of an intended user interaction with a digitizer, the method comprising: characterizing an intended user interaction input signals of a specific user; storing at least one characterization criterion from the characterization; and determining if a subsequently detected input signals meets the at least one characterization criterion.

Optionally, the intended user interaction is finger touch.

Optionally the intended user interaction is finger hovering.

Optionally the intended user interaction is detected by capacitive touch methods.

Optionally, the method comprises accepting the subsequently detected input signals for user interaction on the condition that the subsequently detected input signals meet the at least one characterization criterion.

Optionally, the method comprises rejecting the subsequently detected input signals for user interaction that do not meet the at least one characterization criterion.

Optionally, the rejecting is implemented by the controller.

Optionally, the at least one characterization criterion defines a range in number of conductive lines on the digitizer from which the user interaction input signals were obtained.

Optionally, the at least one characterization criterion defines a pattern of signal amplitudes of the intended user interaction input signals.

Optionally, the at least one characterization criterion defines a range of an area on the digitizer over which the intended user interaction input signals were obtained.

Optionally, the at least one characterization criterion includes a range in a dimension of an area over which the intended user interaction input signals were obtained.

Optionally, the at least on characterization criterion is selected from a group consisting of shape, pressure, and gradient pattern.

Optionally, characterization is performed once for the specific user.

Optionally, the characterization is performed during a system startup.

Optionally, the characterization is updated periodically.

Optionally, the characterization is performed automatically during user operation of the digitizer by the specific user.

Optionally, the characterization is based on averages of a plurality of input signals.

Optionally, the characterization is performed during a dedicated calibration procedure.

Optionally, the method comprises requesting user identification.

Optionally, a host computer associated with the digitizer supplies the user identification.

Optionally, the characterization includes characterization of a finger of the specific user, selected for user interaction.

Optionally, the characterization includes characterization of a plurality of fingers of the specific user.

Optionally, the method comprises characterizing palm resting input signals of the specific user; and determining a characterization criterion to differentiate between the intended user interaction input signals and the palm resting input signals.

Optionally, the method comprises performing palm rejection on subsequently detected input signals that do not meet the at least one characterization criterion.

An aspect of some embodiments of the present invention provides a system for recognizing an intended user interaction with a digitizer comprising: a digitizer operative to detect intended user interaction input signals of a specific user; a controller operative to detect at least one characterization criterion to characterize the user interaction input signals of the specific user and to determine if subsequently detected input signals meet the at least one characterization criterion; and a memory operative to store the at least one characterization criterion.

Optionally, the intended user interaction is finger touch.

Optionally, the intended user interaction is finger hovering.

Optionally, the intended user interaction is detected by capacitive touch methods Optionally, the controller is operative to accept the subsequently detected input signals for user interaction with the digitizer on the condition that the subsequently detected input signals meet the at least one characterization criterion.

Optionally, the controller is operative to reject the subsequently detected input signals for user interaction with the digitizer on the condition that the subsequently detected input signals do not meet the at least one characterization criterion.

Optionally, the system comprises a host computer associated with the digitizer, wherein the digitizer forwards to the host computer input signals that meet the at least one characterization criterion.

Optionally, input signals that do not meet the at least one characterization criterion are rejected for forwarding.

Optionally, the digitizer performs palm rejection on input signals that do not meet the at least one characterization criterion.

Optionally, the system comprises a digitizer sensor, wherein the digitizer sensor comprises a grid of conductive lines and wherein the memory is operative to store a range of numbers of conductive lines from which the intended user interaction input signals were obtained.

Optionally, the digitizer sensor is transparent.

Optionally, the memory is operative to store characterization of a pattern of signal amplitudes of the intended user interaction input signals.

Optionally, the memory is operative to store a range of an area over which the intended user interaction input signals were detected.

Optionally, the memory is operative to store a range of a dimension of an area over which the intended user interaction input signals was detected.

Optionally, the at least on characterization criterion is selected from a group consisting of shape, pressure, and gradient pattern.

Optionally, the controller is operative to characterize the intended user interaction input signals once for the specific user.

Optionally, the controller is operative to characterize the intended user interaction input signals during a system startup.

Optionally the controller is operative to update the at least one characterization criterion periodically based on the subsequent detected input signals.

Optionally, the controller is operative to detect at least one characterization criterion automatically during the specific users operation of the digitizer system.

Optionally, the characterization is based on averages of a plurality of input signals.

Optionally, the system comprises a GUI to guide the specific user through a calibration procedure to characterize the intended user interaction input signals.

Optionally, the controller is operative to identify the specific user.

Optionally, a host computer associated with the digitizer is operative to identify the specific user.

Optionally, the controller is operative to characterize the intended user interaction input signals of a finger of the specified user, selected for user interaction.

Optionally, the controller is operative to characterize the intended user interaction input signals of a plurality of fingers of the specified user.

Optionally, the controller is operative to characterize palm resting input signals of the specified user and to determine a characterization criterion to differentiate between the intended user interaction input signals and the palm resting input signals Optionally, the intended user interaction is stylus together with finger touch.

Optionally, detection of the stylus is implemented to characterize a concurrent finger touch.

BRIEF DESCRIPTION OF THE DRAWINGS

The subject matter regarded is particularly and distinctly claimed in the concluding portion of the specification. Non-limiting examples of embodiments of the present invention are described below with reference to figures attached hereto, which are listed following this paragraph. In the figures, identical structures, elements or parts that appear in more than one figure are generally labeled with a same symbol in all the figures in which they appear. Dimensions of components and features shown in the figures are chosen for convenience and clarity of presentation and are not necessarily shown to scale. For example, the dimensions of some of the elements may be exaggerated relative to other elements for clarity.

It will be appreciated that for simplicity and clarity of illustration, elements shown in the figures have not necessarily been drawn to scale. Further, where considered appropriate, reference numerals may be repeated among the figures to indicate corresponding or analogous elements.

DETAILED DESCRIPTION OF EXEMPLARY EMBODIMENTS

In the following description, exemplary, non-limiting embodiments of the invention incorporating various aspects of the present invention are described. For purposes of explanation, specific configurations and details are set forth in order to provide a thorough understanding of the embodiments. However, it will also be apparent to one skilled in the art that the present invention may be practiced without the specific details presented herein. Furthermore, well-known features may be omitted or simplified in order not to obscure the present invention. Features shown in one embodiment may be combined with features shown in other embodiments. Such features are not repeated for clarity of presentation. Furthermore, some unessential features are described in some embodiments.

Figure 1:
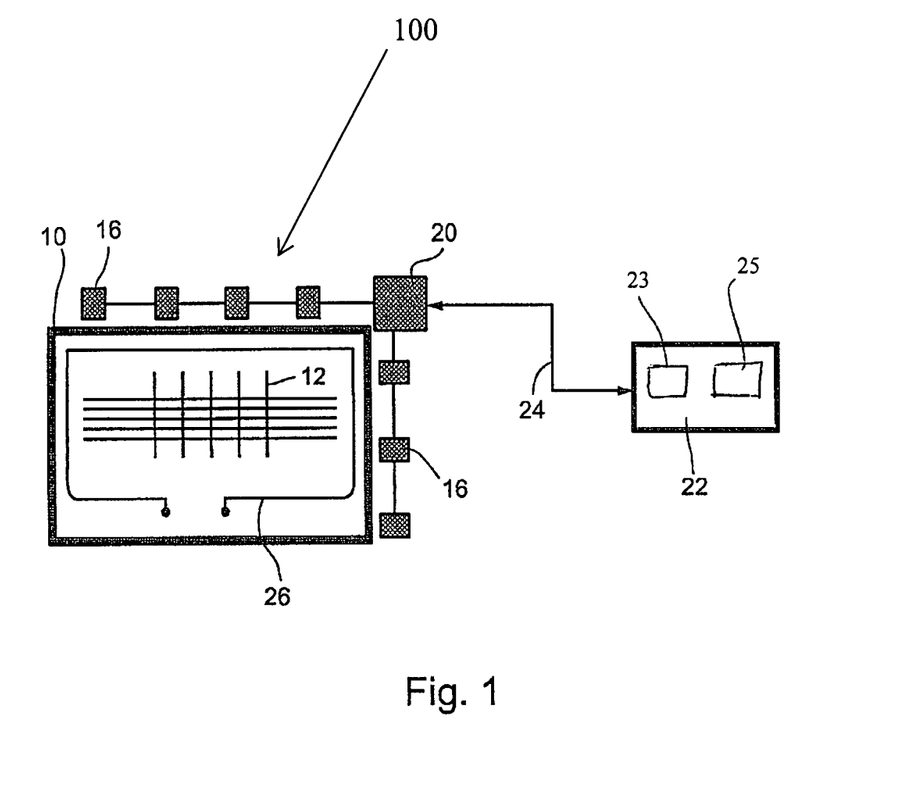
FIG. 1 is an exemplary simplified block diagram of a digitizer system in accordance with some embodiments of the present invention.

Reference is now made to FIG. 1 showing an exemplary simplified block diagram of a digitizer system in accordance with some embodiments of the present invention. The digitizer system shown in FIG. 1 may be suitable for any computing device that enables interactions between a user and the device, e.g. mobile computing devices that include, for example, FPD screens. Examples of such devices include Tablet PCs, pen enabled lap-top computers, PDAs or any hand held devices such as palm pilots and mobile phones. According to some embodiments of the present invention, the digitizer system comprises a grid-based sensor 12, which is optionally transparent, and which is typically overlaid on an FPD 10. An ASIC 16 comprises circuitry to process and sample the sensor's output into a digital representation. The digital output signal is forwarded to a digital unit 20, e.g. digital ASIC unit, for further digital processing. According to some embodiments of the present invention, the digital unit 20 and/or ASIC units 16 function as the controller of the digitizer system and/or have functionality of a controller. According to some embodiments of the present invention digital unit 20 and/or ASIC units 16 include memory capability. The outcome, once determined, is forwarded to host 22 via interface 24 for processing by the operating system or any current application. According to some embodiments of the present invention, control functionality and memory is additionally included in the host 22.

According to some embodiments of the present invention, sensor 12 comprises a grid and/or matrix of conductive lines made of conductive materials, optionally Indium Tin Oxide (ITO), patterned on a foil or glass substrate. The conductive lines and the foil are optionally transparent. Typically, the grid is made of two layers, which are electrically separated from each other. Typically, one of the layers contains a set of equally spaced parallel conductors and the other layer contains a set of equally spaced parallel conductors orthogonal to the set of the first layer. Typically, the parallel conductors are equally spaced straight lines, and are input to amplifiers included in ASIC unit 16. Optionally the amplifiers are differential amplifiers. Typically, the parallel conductors are spaced at a distance of approximately 2-8 mm, e.g. 4 mm, optionally depending on the size of the FPD.

Typically, the ASIC unit is connected to outputs of the various conductors in the grid and functions to process the received signals at a first processing stage. As indicated above, ASIC unit 16 typically includes an array of amplifiers, e.g. differential amplifiers, to amplify the sensor's signals. Additionally, ASIC unit 16 includes one or more filters to remove irrelevant frequencies. Optionally, filtering is performed prior to sampling. The signal is then sampled by an A/D, optionally filtered by a digital filter and forwarded to digital ASIC unit, for further digital processing.

According to some embodiments of the invention, digital unit 20 reads the sampled data, processes it and determines the position and/or location of the physical objects, such as stylus, and/or finger touch or hover. Calculated position is sent to the host computer via interface 24.

According to some embodiments, digital unit 20 produces and manages a triggering pulse to be provided to excitation coil 26 that surrounds the sensor arrangement and the display screen. The excitation coil provides a trigger pulse that excites passive circuitry in the stylus to produce a response from the stylus that can subsequently be detected.

According to some embodiments, digital unit 20 produces and manages a triggering pulse to at least one of the conductive lines.

According to some embodiments of the invention, host 22 includes at least a storage unit 23 and a processing unit 25 to store and process information from digitizer 16. Memory and processing capability is also included in digital unit 20 and ASIC unit 16. According to some embodiments of the present invention memory and processing functionality may be divided between host 22, digitizer unit 20, and ASIC unit 16.

Stylus Detection

According to some embodiments of the present invention, the stylus is a passive element. Optionally, the stylus comprises a resonant circuit, which is triggered by excitation coil 26 to oscillate at its resonant frequency.

Alternatively, the stylus may include an energy pick-up unit and an oscillator circuit. At the resonant frequency the circuit produces oscillations that continue after the end of the excitation pulse and steadily decay. The decaying oscillations induce a voltage in nearby conductive lines which are sensed by the sensor 12. According to some embodiments of the present invention, two parallel sensor lines that are close but not adjacent to one another are connected to the positive and negative input of a differential amplifier respectively. The amplifier is thus able to generate an output signal which is an amplification of the difference between the two sensor line signals. An amplifier having a stylus on one of its two sensor lines will produce a relatively high amplitude output. Stylus detection is described with further details in, for example incorporated US Patent Application Publication 20040095333.

Finger Touch Detection

Figure 2:
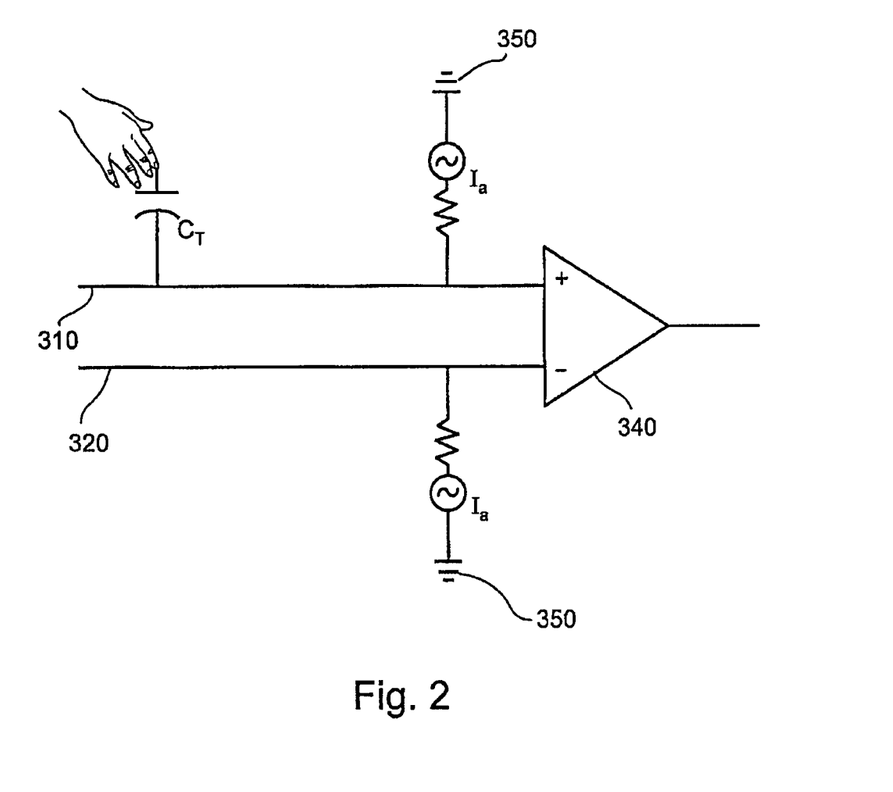
FIG. 2 is an exemplary simplified circuit diagram for capacitive touch detection according to some embodiments of the present invention.

Reference is now made to FIG. 2 showing an exemplary circuit diagram for capacitive touch detection according to some embodiments of the present invention. Conductive lines 310 and 320 are parallel non-adjacent lines of sensor 12. According to some embodiments of the present invention, conductive lines 310 and 320 are interrogated to determine if there is a finger. To query the pair of conductive lines, a signal source $I_a$, e.g. an AC signal source induces an oscillating signal in the pair. Signals are referenced to a common ground 350. When a finger is placed on one of the conductive lines of the pair, a capacitance, $C_T$, develops between the finger and conductive line 310. As there is a potential between the conductive line 310 and the user's finger, current passes from the conductive line 310 through the finger to ground. Consequently a potential difference is created between conductive line 310 and its pair 320, both of which serve as input to differential amplifier 340. Finger touch detection is described with further details in, for example incorporated US Patent Application Publication 20040155871.

Figure 3:
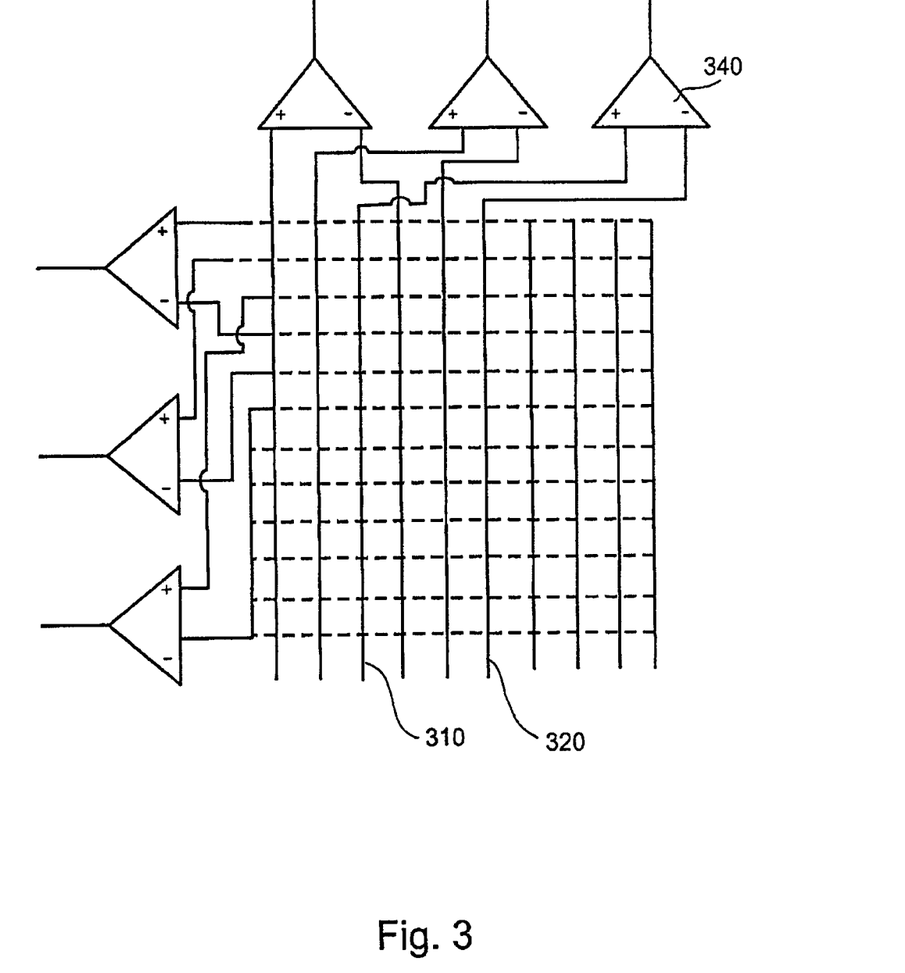
FIG. 3 is an exemplary simplified circuit diagram of a digitizer sensor including differential amplifiers according to some embodiments of the present invention.

Reference is now made to FIG. 3 showing an array of conductive lines of the digitizer sensor as input to differential amplifiers according to embodiments of the present invention. Separation between the two conductors 310 and 320 is typically greater than the width of the finger so that the necessary potential difference can be formed, e.g. approximately 12 mm. Typically a finger touch on the sensor may span 2-8 lines, e.g. 6 conductive lines. Typically, the finger is placed over a number of conductive lines so as to generate an output signal in more than one differential amplifier, e.g. a plurality of differential amplifier's. However, a finger touch may be detected when placed over one conductive line. The differential amplifier 340 amplifies the potential difference developed between conductive lines 310 and 320. ASIC 16 and digital unit 20 process the amplified signal and thereby determine the location of the user's finger based on the amplitude and/or signal level of the sensed signal. In one example, the origin of the user's finger from the two inputs of the differential amplifier is determined by examining the phase of the output. In another example, since a finger touch typically produces output in more than one conductive line, the origin of the of the user's finger from the two inputs of the differential amplifier is determined by examining outputs of neighboring amplifiers and optionally interpolating to find a more accurate value. In yet other examples, a combination of both methods may be implemented.

Figure 4:
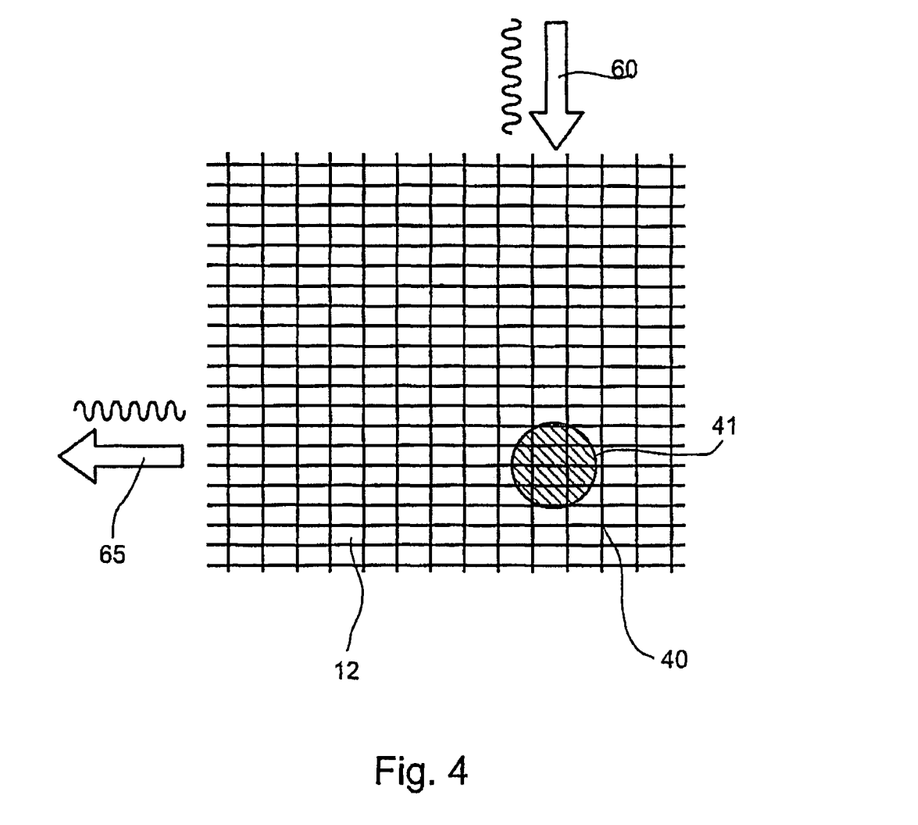
FIG. 4 is a schematic illustration of a digitizer sensor for finger touch detection based on a junction capacitive touch method for detecting finger touch according to some embodiments of the present invention.

Reference is now made to FIG. 4 which schematically illustrates a junction capacitive touch method for finger touch detection using a digitizer sensor, according to some embodiments of the present invention. At each junction, e.g. junction 40 in sensor 12 a minimal amount of capacitance exists between orthogonal conductive lines. In an exemplary embodiment, an AC signal 60 is applied to one or more parallel conductive lines in the two-dimensional sensor matrix 12. When a finger 41 touches the sensor at a certain position where signal 60 is induced, the capacitance between the conductive line through which signal 60 is applied and the corresponding orthogonal conductive lines at least proximal to the touch position increases and signal 60 crosses by virtue of the capacitance of finger 41 to corresponding orthogonal conductive lines to produce and an output signal 65. This method is able to detect more than one finger touch at the same time, e.g. multi-touch. This method further enables calculating touch area. In exemplary embodiments of the present invention, each conductive line is input to an amplifier. Optionally, each line is input to a differential amplifier, while the other input to the amplifier is ground. Typically, the presence of a finger decreases the coupled signal by 20-30% since the capacitive coupling caused by the finger typically drains current from the lines.

The present invention is not limited to the technical description of the digitizer system described herein. Digitizer systems used to detect stylus and/or finger location may be, for example, similar to digitizer systems described in incorporated U.S. Pat. No. 6,690,156, U.S. Patent Application Publication No. 20040095333 and/or U.S. Patent Application Publication No. 20040155871. It will also be applicable to other digitized systems and/or touch screen systems known in the art, depending on their construction.

According to some embodiments of the present invention, input signals to the digitizer due to one or more of a hand resting on the digitizer, finger and hand hovering over the digitizer, and/or mechanical changes between the digitizer and the LCD may be mistaken for finger touch input signals intended for user interaction with the digitizer system. According to some embodiments of the present invention, specific pre-determined features of a finger touch signal of a user may be characterized and one or more characterization criterion may be used to distinguish between input signals intended for user interaction, e.g. finger touch, and input signal not intended for user interaction, e.g. one or more of a hand resting on the digitizer, finger and hand hovering over the digitizer, and/or mechanical changes between the digitizer and the LCD.

According to some embodiments of the present invention, hovering, e.g. finger hovering is implemented for user interaction, e.g. to control cursor position as is described in US Patent Application entitled "Hover And Touch Detection For A Digitizer", assigned to the common assignee and filed on even date hereof. For such cases input signals due to finger hovering may be distinguished over other signal sources not intended for user interaction with the digitizer system based on one or more characterization criterion.

Figure 5:
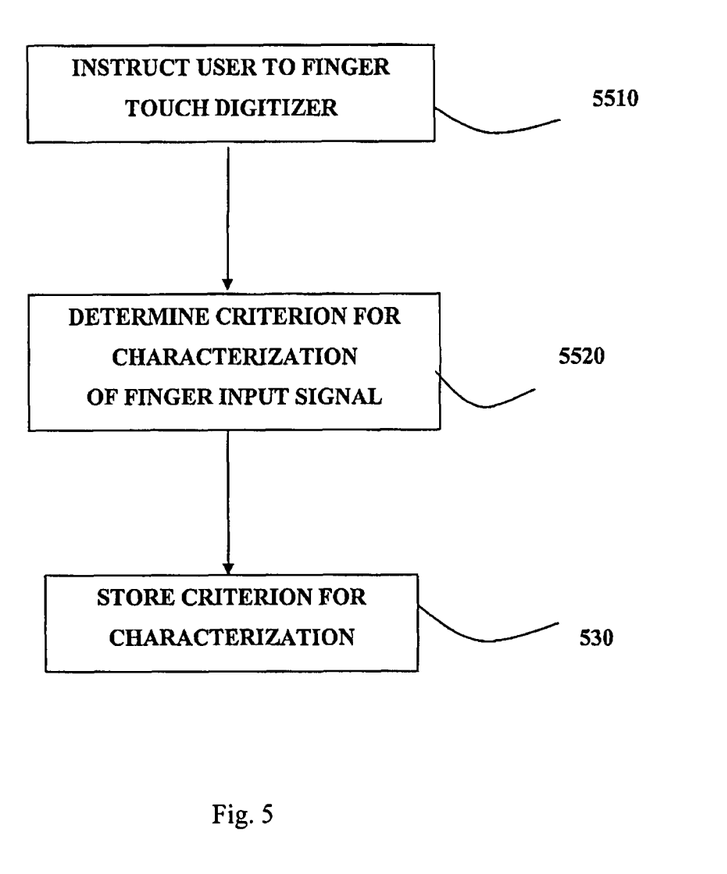
FIG. 5 is an exemplary flow chart describing a dedicated calibration method to characterize finger touch signals for a specific user according to some embodiments of the present invention.

According to some embodiments of the present invention, feature extraction is performed from the finger touch input signal and/or characterization of a finger touch input signal of a specific user is determined during a calibration procedure. One or more characterization criteria for characterizing an intended user interaction are determined and subsequently detected input signals are tested against the characterization criteria. Reference is now made to FIG. 5 describing a calibration procedure to characterize finger touch signals for a specific user according to some embodiments of the present invention.

According to some embodiments of the present invention, a graphical user interface (GUI) may guide a user through a calibration procedure. In some exemplary embodiments a user can initiate the calibration procedure through a control panel of the GUI. In some exemplary embodiments, a user is requested to place one or more fingers over the digitizer sensor 12 and/or FPD 10 (block 5510). For example, a user is requested to position one or more fingers over a specific position indicated by a GUI. A user may be requested to point and/or select a feature on the GUI. In some exemplary embodiments, the user is requested to place a specific finger, e.g. a pointer finger, such as the index finger, on the screen and/or is requested to place the entire hand so that, for example, a contour of the hand can be detected and stored. In some examples, the user is requested to position one or more fingers on the digitizer sensor 12 for a defined period of time. The received input signals are detected and one or more specific features of the signal are determined based on the received signal during a learning process and/or feature extraction process (block 5520). According to some embodiments of the present invention, the specific features and/or characterization criteria are determined based on average values of a plurality of detected input signals. According to some embodiments of the present invention, feature extraction is performed on the ASIC level, e.g. ASIC 16 and/or 20. Alternatively and/or additionally feature extraction and/or processing is performed in host computer 22, e.g. by processor 25. One or more parameters and/or characterization criteria characterizing the detected specific features of the signal are stored in memory (block 5530), e.g. memory incorporated in ASIC 16 and/or 20. Alternatively, one or more parameters are stored in storage unit 23 of host 22. According to some embodiments of the present invention, the parameters are determined based on average and/or cumulative parameter values determined.

According to some embodiments of the present invention, only one of the one or more fingers characterized may be selected for intended user interaction. As such, the system will be implemented to reject finger touch from the other fingers not selected for user interaction.

According to some embodiments of the present invention, a user is requested to position his palm on the digitizer sensor and/or to rest his hand over the digitizer sensor and a signal derived from a palm and/or hand resting event is characterized. According to some embodiments of the present invention, typical finger touch events are compared with typical hand resting events and/or other events not intended for user interaction. The comparison can be used to determine features that can be used to distinguish between finger touch events and hand resting events and/or other events not intended for user interaction.

According to some embodiments of the present invention, a user is requested to hover a finger over the digitizer sensor and/or to hover a finger along a defined path over the digitizer sensor and a signal derived from the hovering event is characterized. According to some embodiments of the present invention, hovering events of the defined user can be recognized based on the characterization and accepted for user interaction.

According to some embodiments of the present invention, the method described in reference to FIG. 5 is performed once for a specific user, e.g. each new user. According to some embodiments of the present invention, the method described in FIG. 5 is performed during each start up of the system. According to other embodiments of the present invention, the method described in reference to FIG. 5 is updated periodically, e.g. once a week, once a month, once in 6 months, once a year. Optionally, a user initiates a calibration and/or an update through a control panel of the GUI.

Figure 6:
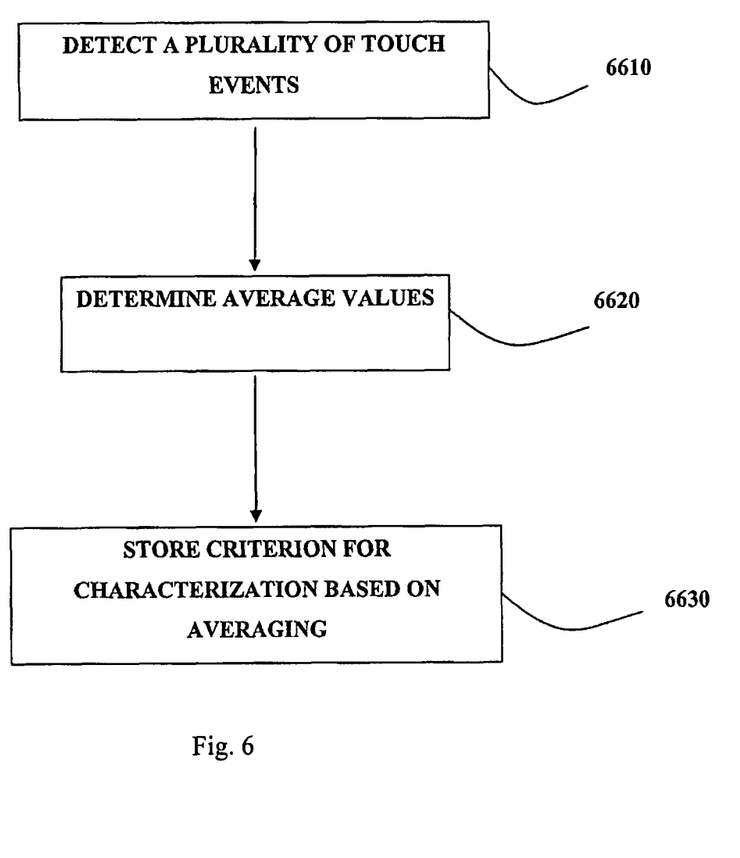
FIG. 6 is an exemplary flow chart describing an alternate calibration method to characterize finger touch signals for a specific user according to some embodiments of the present invention.

Reference is now made to FIG. 6 describing an alternate calibration method to characterize finger touch signals for a specific user according to some embodiments of the present invention. According to some embodiments of the present invention, the calibration procedure is semi-automatic, substantially automatic and is performed during normal user operation of the digitizer system. In some exemplary embodiments, while a digitizer system tracks a stylus for user interaction, touch input signals simultaneously detected are characterized, defined as and/or assumed to be palm events. In another example, while a digitizer system is tracking a touch event, the touch input signals are defined as and/or assumed to be finger touch events. According to some embodiments of the present invention, input signals selected for characterization during calibration are based on the above assumptions.

According to some embodiments of the present invention, the calibration procedure and/or feature detection procedure is iterative and improves over time with use of the digitizer system by the user. According to some embodiments of the present invention one or more touch events are detected (block 6610). In some exemplary embodiments a pre-determined number of touch events are detected. In some exemplary embodiments, calibration is initially determined based on one touch event and later updated as more touch events are detected. According to some embodiments of the present invention, average detected input signals are determined and/or average parameters values characterizing the detected input signals are determined (block 6620) and used for calibration. One or more parameters of the signal are stored in memory (block 6630).

It is noted that during semi-automatic feature extraction as described in reference to FIG. 6, one or more detected input signals used to characterize finger touch input signals may be derived from signals not intended for user interaction. However, the use of average values and/or an accumulation of signals received serve to minimize the influence of those signals not intended for user interaction. Typically, averaging minimizes noise that may provide temporary distortions of the measurement do to signals detected that are not intended for user interaction. Typically, the host computer supplies the user identification to the associated digitizer (e.g. the operating system of the host supplies user identification information). Optionally, a user will be asked to be identified at the start of operating the digitizer system, e.g. by selecting and/or entering a user name so that the digitizer system can associate detected finger touch input signals with a specific user.

According to embodiments of the invention, characterizing features specific to each user and implementing the characterization to determine if a received and/or detected input signal is a input signal intended for user interaction facilitates improved performance of the system by enabling the digitizer to ignore and/or filter out signals that are not finger touch derived signals. Signals that are not derived from finger touch may include palm or hand resting and/or hovering over the screen, signals arising from mechanical changes between the digitizer and the LCD that might be interpreted as touch signals, hand touching the frame of the screen, etc.

According to some embodiments of the present invention, once features of a user's finger touch are stored, verification of each event is performed, e.g. a subsequently detected input signals are analyzed to determine if they meet the characterization criteria. In some exemplary embodiment, signals detected during a user interaction event are compared with the stored data of the user's touch characteristics. For example, a sample signal detected may be selected and compared with the stored data of the user's touch characteristics. Based on the comparison, the system distinguishes between finger touch events to other events which are not interpreted as a user interaction, such as a palm event, where a user is placing his palm on the display screen, and a hand event, where a user is placing his hand on the display screen. Finger touch events are verified prior to using them for user interaction. In some exemplary embodiments, the system ignores events which do not apply to the specific user's touch characteristics, thereby filtering other signals which are not finger touch. Events that are ignored are typically not forwarded to the host computer. Hover events intended for user interaction may also be recognized and distinguished over other events, e.g. other hovering events not intended for user interaction. According to some embodiments of the present invention, the system accepts input signals for user interaction on the condition that the input signals meet the characterization criteria defined for intended user interaction and those input signals are forwarded to the host computer associated with the digitizer system. According to some embodiments of the present invention, the digitizer rejects input signals that do not meet the characterization criteria for the specified user. According to some embodiments of the present invention, rejected input signals are not forwarded to the host computer associated with the digitizer and therefore are not implemented for user interaction. Typically rejection is implemented by the controller, e.g. ASIC 20.

According to some embodiments of the present invention, the digitizer system is capable of supporting a plurality of users where the system learns and/or determines the finger characteristics of the different users and a database is dedicated for storing each user's finger characteristics. According to some embodiments of the present invention, the digitizer system can recognize and/or identify a user based on the users finger touch characteristics. According to some embodiments of the present invention, a user may be requested to provide identity, e.g. by entering and/or selecting a username so that input to the system may be verified. According to some embodiments of the present invention, user input signal verification is optional and a user can choose operate the digitizer system without verification.

According to some embodiments of the present invention, one or more defined features are used to characterize a users finger touch input signal. In some exemplary embodiments features include one or more of the following: number of conductive lines detecting a signal, amplitude of the detected signals, estimated applied pressure determined from the receive signal, detected area of the touch event, detected dimension of the touch event, e.g. width and/or length, shape of the touch event, gradient amplitude values and/or patterns of the signal etc. In one exemplary embodiment, number and types of features used to characterize a user's finger touch signal are predetermined. In another exemplary embodiment, the number and types of features used are customized for each user and depend on the quality of the received signal.

According to some embodiments of the present invention, the number of conductive lines sensing and/or detecting a finger tip touch event can be used to differentiate between finger touch and other events not intended for user interaction. The number of conductors detecting a signal increases as function of the finger size. Users' finger area can vary between 100 and 500 mm$^2$. If during a calibration procedure it is determined that a particular users finger touch typically results in input signal detection in a pre-defined range of conductive lines, e.g. 3-4, detected signals spanning over more or less than the determined range can be ignored and/or rejected. Alternatively only detected input signals spanning over the determined range of conductive lines are accepted for user interaction.

According to some embodiments of the present invention, when using a junction capacitive type method, for example as is described in reference to FIG. 4, the touch area can be determined and used to characterize a user's finger touch. For example, a user's touch may result in a typical detected touch area for that user. The area, a dimension of the area, and/or the shape of the area may be used to characterize the user's finger touch signal. Other detected areas derived from, for example hand resting, will be rejected.

According to some embodiments of the present inventions, an amount of pressure that a user typically applies when interacting with the digitizer is used to characterize that user's signal. For example, if a user typically presses hard on the screen when interacting with the digitizer, signals detected with low determined pressures can be ignored. In some exemplary embodiment, pressure applied by a user's finger touch is correlated with the amplitude of the detected signal and a typical range of signal amplitudes can be used to characterize a user's finger touch. According to some embodiments of the present invention, pressure is determined by a combination of amplitude and area detection. In some exemplary embodiments, a pressure sensor is used to sense touch contact pressure.

Figure 7A:
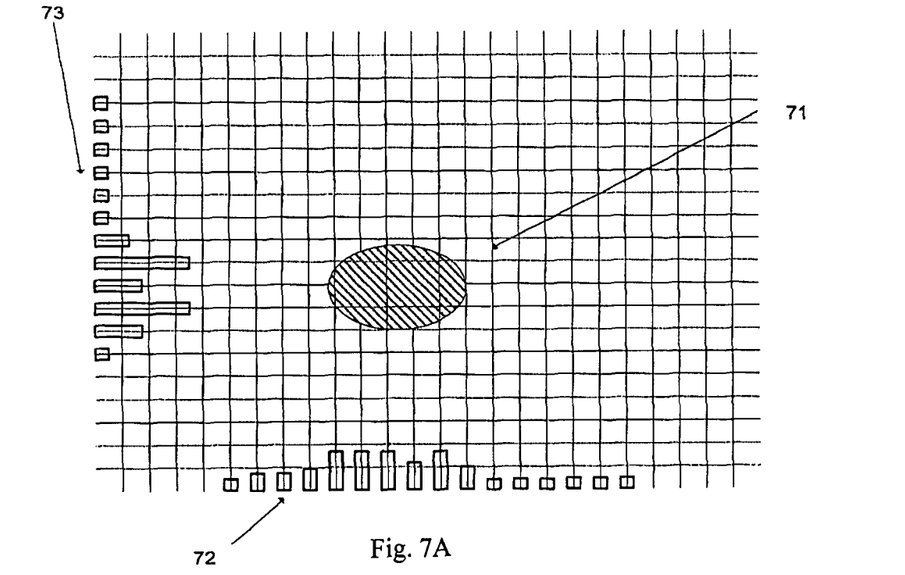
FIG. 7A is a schematic illustration of an exemplary signal pattern of signal amplitudes obtained from finger touch detection according to some embodiments of the present invention.
Figure 7B:
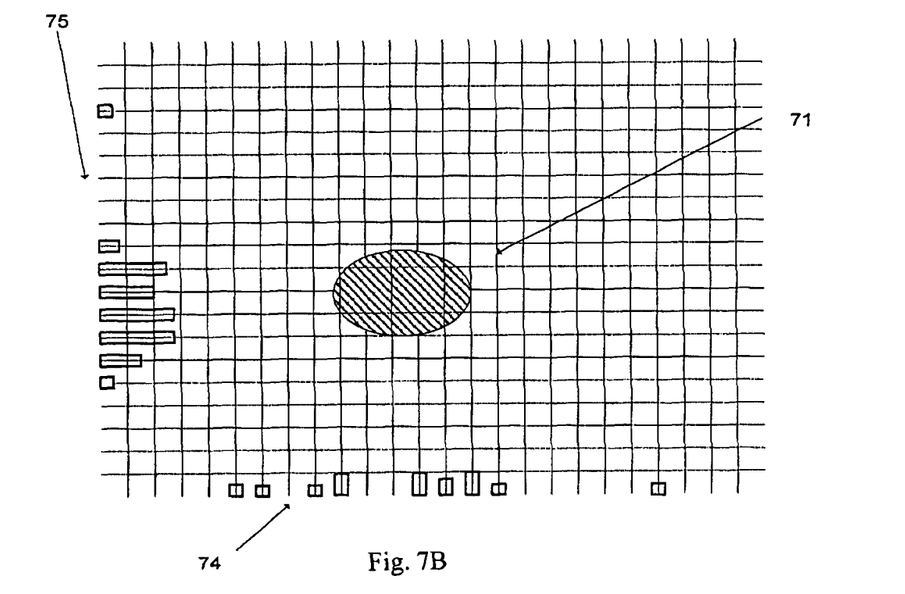
FIG. 7B is a schematic illustration of an exemplary signal pattern of signal amplitude gradients obtained from finger touch detection according to some embodiments of the present invention.

According to some embodiments of the present invention, amplitude and gradient spatial patterns are constructed to characterize a user's finger touch. According to some embodiments of the present invention, a user's input signal is characterized based on patterns of signal amplitudes and patterns of signal amplitude gradients. Typically, each user touches the sensor differently. For example, some users have a light touch and produce a relatively low amplitude pattern and low gradient at the contour of the touch area. Other users which have a stronger touch produce a higher amplitude pattern over a larger area with higher gradients at the contour of the touch area. The width of the finger also affects the signal detected. In some exemplary embodiments, methods similar to methods described in U.S. Provisional Patent Application No. 60/812,994 filed on Jun. 13, 2006 and corresponding US Patent Application filed on Jun. 13, 2007 and assigned to the common assignee. Reference is now made to FIG. 7A showing an exemplary signal pattern of signal amplitude outputs from a differential amplifier obtained from a finger touch and to FIG. 7B showing an exemplary signal pattern of signal amplitude gradients obtained from a finger touch according to some embodiments of the present invention. The present inventors have found signal patterns that are typical of finger touch and that thus it is possible to differentiate between finger touch and other detected signals on the digitizer, e.g. due to a hand resting on the digitizer, mechanical changes between the digitizer and the LCD. According to some embodiments of the present invention, amplitude patterns typical to a specific user are defined and used to differentiate between finger touch and other detected signals on the digitizer. For example, the number of conductive lines having amplitude above a defined threshold can be used to identify a finger touch for a specific user and differentiate between the user's finger touch and other events detected.

In FIG. 7A, an area 71 over which a finger touches the digitizer sensor induces a plurality of signals on the vertical and horizontal conductive lines of the digitizer sensor. The amplitude of the detected signals sensed from the horizontal conductive lines are represented by bars 73 and the amplitude of the detected signals sensed from the horizontal conductive lines are represented by bars 72. In some exemplary embodiments, signals are detected on conductive lines area 71 as well as in neighboring conductive lines. Typically, the signals induced in the neighboring conductive lines occur due to mechanical changes of the sensor and the LCD when the finger presses down the digitizer sensor and LCD screen. In some exemplary embodiments, only amplitudes above a pre-defined level are considered.

In FIG. 7B, the gradient of signal amplitudes are defined as the absolute values of the differences of amplitudes sensed on two neighboring conductive lines. Optionally the gradient is divided by the distance between the neighboring conductive lines. In some exemplary embodiments, only gradients above pre-defined level are considered. Other known methods of representing a gradient in a signal may be implemented and used to verify finger touch. According to some embodiments of the present invention, gradient patterns typical to a specific user are defined and used to differentiate between finger touch and other detected signals on the digitizer. For example, the number of conductive lines associated with above a defined threshold can be used to identify a finger touch for a specific user and differentiate between the user's finger touch and other events detected.

Although the system and method described herein has been mostly described in reference to user specific finger touch recognition on a digitizer, a similar system and method can be used for user specific recognition of other intended user interactions with a digitizer. For example a similar system and method can be implemented for recognition of finger hovering over a digitizer, etc.

It should be further understood that the individual features described hereinabove can 10 be combined in all possible combinations and sub-combinations to produce exemplary embodiments of the invention. Furthermore, not all elements described for each embodiment are essential. In many cases such elements are described so as to describe a best more for carrying out the invention or to form a logical bridge between the essential elements. The examples given above are exemplary in nature and are not intended to limit the scope of the invention which is defined solely by the following claims.

The terms "include", "comprise" and "have" and their conjugates as used herein mean "including but not necessarily limited to".

The invention claimed is:

1. A method for recognition of an intended user interaction with a digitizer, the method comprising:
    sampling signals obtained on a digitizer;
    detecting touching or hovering of a user interaction;
    computing an amplitude gradient of the signals sampled, wherein the amplitude gradient is a gradient across an area on a digitizer over which the touching or hovering of a user interaction is detected;
    characterizing the amplitude gradient associated with a specific user;
    storing at least one parameter determined by the characterizing; and
    determining if subsequently detected signals comply with the characterizing.

2. The method according to claim 1 wherein the user interaction is detected by capacitive touch methods.

3. The method according to claim 1 comprising accepting the subsequently detected signals for user interaction on the condition that the subsequently detected signals comply with the characterizing.

4. The method according to claim 1 comprising rejecting the subsequently detected signals that do not comply with the characterizing.

5. The method according to claim 1 wherein characterization is performed once for the specific user.

6. The method according to claim 1 wherein the characterization is performed during a system startup.

7. The method according to claim 1 wherein the characterization is updated periodically.

8. The method according to claim 1 wherein the characterization is performed automatically during user operation of the digitizer by the specific user.

9. The method according to claim 1 wherein the characterization is based on averages of a plurality of the user interaction signals.

10. The method according to claim 1 wherein the characterization is performed during a dedicated calibration procedure.

11. The method according to claim 1 comprising requesting user identification.

12. The method according to claim 1 wherein a host computer associated with the digitizer supplies the user identification.

13. The method according to claim 1 wherein the characterization includes characterization of a finger of the specific user, selected for user interaction.

14. The method according to claim 1 wherein the characterization includes characterization of a plurality of fingers of the specific user.

15. The method according to claim 1 comprising:
characterizing palm resting signals of the specific user; and
determining a parameter of the characterizing to differentiate between the user interaction signals and the palm resting signals.

16. The method according to claim 1 comprising performing palm rejection on subsequently detected signals that do not comply with the characterizing.

17. A system for recognizing an intended user interaction with a digitizer comprising:
a digitizer operative to sample signals, detect touching or hovering of a user interaction and compute an amplitude gradient in the signals sampled across an area on a digitizer over which a user interaction touches or hovers;
a controller operative to detect at least one characterization based on the gradients to characterize the user interaction signals of the specific user and to determine if subsequently detected signals meet the at least one characterization; and
a memory operative to store the at least one parameter of the characterization.

18. The system according to claim 17 wherein the controller is operative to accept the subsequently detected signals for user interaction with the digitizer on the condition that the subsequently detected signals comply with the at least one characterization.

19. The system according to claim 17 wherein the controller is operative to reject the subsequently detected signals for user interaction with the digitizer on the condition that the subsequently detected signals do not comply with the at least one characterization.

20. The system according to claim 17 comprising a host computer associated with the digitizer, wherein the digitizer forwards to the host computer signals that comply with the at least one characterization.

21. The system according to claim 20 wherein signals that do not comply with the at least one characterization are rejected for forwarding.

22. The system according to claim 17 wherein the digitizer performs palm rejection on signals that do not comply with the at least one characterization.

23. The system according to claim 17 comprising a digitizer sensor, wherein the digitizer sensor comprises a grid of conductive lines and wherein the controller is operative to detect a characterization criteria based on number of conductive lines from which the user interaction signals are obtained.

24. The system according to claim 23 wherein the digitizer sensor is transparent.

25. The system according to claim 17 wherein the controller is operative to characterize the user interaction signals once for the specific user.

26. The system according to claim 17, wherein the amplitude gradient characterized by the controller is an amplitude gradient obtained from an intended user interaction.

27. The system according to claim 17 wherein the controller is operative to update the at least one characterization periodically based on the subsequent detected signals.

28. The system according to claim 17 wherein the controller is operative to detect at least one characterization automatically during the specific user's operation of the digitizer system.

29. The system according to claim 17 wherein the characterization is based on averages of a plurality of signals.

30. The system according to claim 17 comprising a GUI to guide the specific user through a calibration procedure to characterize the user interaction signals.

31. The system according to claim 17 wherein the controller is operative to identify the specific user.

32. The system according to claim 17 wherein a host computer associated with the digitizer is operative to identify the specific user.

33. The system according to claim 17 wherein the controller is operative to characterize the user interaction signals of a finger of the specific user, selected for user interaction.

34. The system according to claim 17 wherein the controller is operative to characterize the user interaction signals of a plurality of fingers of the specific user.

35. The system according to claim 17 wherein the controller is operative to characterize palm resting signals of the specified user and to determine a characterization to differentiate between the user interaction signals and the palm resting signals.

36. The system according to claim 17 wherein the intended user interaction is stylus together with finger touch.

37. The system according to claim 36 wherein detection of the stylus is implemented to characterize a concurrent finger touch.

38. The method of claim 1, wherein the amplitude gradient characterized is an amplitude gradient obtained from an intended user interaction.

39. The method according to claim 38 wherein the intended user interaction that is characterized is finger touch.

40. The method according to claim 38 wherein the intended user interaction that is characterized is finger hovering.

41. The method according to claim 38 comprising characterizing the intended user interaction signals of the specific user based on a number of conductive lines on the digitizer from which the intended user interaction signals are obtained.

42. The method according to claim 38 comprising characterizing the intended user interaction signals of the specific user based on a pattern of signal amplitudes of the intended user interaction signals.

43. The method according to claim 38 comprising characterizing the intended user interaction signals of the specific user based on an area on the digitizer over which the intended user interaction signals are obtained.

44. The method according to claim 38 comprising characterizing the intended user interaction signals of the specific user based on a dimension of an area over which the intended user interaction signals are obtained.

45. The method according to claim 38 comprising characterizing the intended user interaction signals of the specific user based on at least one of shape and pressure of the intended user interaction on the digitizer.

46. The system according to claim 26, wherein the intended user interaction is finger touch.

47. The system according to claim 26, wherein the intended user interaction is finger hovering.

48. The system according to claim 26, wherein the intended user interaction is detected by capacitive touch methods.

49. The system according to claim 26, wherein the controller is operative to determine a characterization criteria based on a pattern of signal amplitudes of the intended user interaction signals.

50. The system according to 26, wherein the controller is operative to determine a characterization criteria based on a range of an area over which the intended user interaction signals are detected.

51. The system according to claim 26, wherein the controller is operative to determine a characterization criteria based on a dimension of an area over which the intended user interaction signals are detected.

52. The system according to claim 26, wherein the characterizing includes characterizing at least one of shape and pressure of the intended user interaction on the digitizer.

53. The system according to claim 17 wherein the controller is operative to characterize the user interaction signals during a system startup.

* * * * *